United States Patent
Parodi

(10) Patent No.: US 11,035,959 B1
(45) Date of Patent: Jun. 15, 2021

(54) SELECTION OF SATELLITES FOR GLOBAL POSITIONING SYSTEM

(71) Applicant: Amazon Technologies, Inc., Seattle, WA (US)

(72) Inventor: Carlos Guillermo Parodi, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 705 days.

(21) Appl. No.: 15/491,783

(22) Filed: Apr. 19, 2017

(51) Int. Cl.
| | |
|---|---|
| *G01S 19/28* | (2010.01) |
| *G01S 19/47* | (2010.01) |
| *G01C 21/20* | (2006.01) |
| *G01C 21/16* | (2006.01) |
| *B64C 39/02* | (2006.01) |
| *G08G 5/00* | (2006.01) |

(52) U.S. Cl.
CPC ............ *G01S 19/28* (2013.01); *B64C 39/024* (2013.01); *G01C 21/165* (2013.01); *G01C 21/20* (2013.01); *G01S 19/47* (2013.01); *G08G 5/0069* (2013.01)

(58) Field of Classification Search
None
See application file for complete search history.

(56) References Cited

U.S. PATENT DOCUMENTS

| | | | | |
|---|---|---|---|---|
| 5,808,581 A | * | 9/1998 | Braisted | G01S 19/20 342/357.58 |
| 6,151,551 A | * | 11/2000 | Geier | G01S 19/17 340/425.5 |
| 10,422,658 B2 | * | 9/2019 | Steinhardt | G01C 21/165 |
| 2003/0055561 A1 | * | 3/2003 | Mori | G01C 21/165 701/468 |

(Continued)

FOREIGN PATENT DOCUMENTS

| | | | |
|---|---|---|---|
| JP | 2004085222 A | * | 3/2004 |
| JP | 2009139281 A | * | 6/2009 |

OTHER PUBLICATIONS

Takemura, Hajime, Machine translation of JP-2004085222-A, Mar. 2004, espacenet.com (Year: 2004).*

(Continued)

*Primary Examiner* — David P. Merlino
(74) *Attorney, Agent, or Firm* — Lee & Hayes, P.C.

(57) ABSTRACT

A system may include a global positioning system (GPS) receiver and inertial measurement units configured to generate signals representative of relative motion of the GPS receiver. The system may also include a navigation processor configured to receive a first position determination from the GPS receiver, and determine relative motion of the GPS receiver with respect to the first position determination based at least in part on signals received from the inertial measurement units. The navigation processor may also receive second respective distances between the GPS receiver and respective satellites based on signals received (Continued)

from the respective satellites, and determine second projected distances between the GPS receiver and the respective satellites based on the relative motion determination. The navigation processor may also select satellites from among the respective satellites for determining a second position of the GPS receiver based on a comparison of second respective distances and the second projected distances.

20 Claims, 7 Drawing Sheets

(56) References Cited

U.S. PATENT DOCUMENTS

| | | | | |
|---|---|---|---|---|
| 2004/0239560 | A1* | 12/2004 | Coatantiec | G01S 19/20 342/357.62 |
| 2010/0176992 | A1* | 7/2010 | T'siobbel | G01S 19/22 342/357.25 |
| 2013/0050018 | A1* | 2/2013 | Jeong | G01S 19/42 342/357.25 |
| 2013/0088389 | A1* | 4/2013 | Yamada | G01S 19/22 342/357.67 |
| 2014/0074397 | A1* | 3/2014 | Vanderwerf | G01S 19/20 701/472 |
| 2014/0333478 | A1* | 11/2014 | Andre | G01S 19/28 342/357.67 |
| 2014/0333479 | A1* | 11/2014 | Steinhardt | G01S 19/22 342/357.67 |
| 2015/0153459 | A1* | 6/2015 | Shim | G01S 19/40 342/357.23 |
| 2015/0316656 | A1* | 11/2015 | Calmettes | G01S 19/428 342/357.25 |
| 2016/0084962 | A1* | 3/2016 | Vercier | G01S 19/20 342/357.58 |
| 2017/0254906 | A1* | 9/2017 | Gowda | G01S 19/54 |
| 2018/0010914 | A1* | 1/2018 | Hardt | G01C 21/165 |
| 2018/0270783 | A1* | 9/2018 | Venkatraman | G01S 5/12 |

OTHER PUBLICATIONS

Aoki, Toshiyuki, Machine translation of JP-2009139281-A, Jun. 2009, espacenet.com (Year: 2009).*

* cited by examiner

SELECTION OF SATELLITES FOR GLOBAL POSITIONING SYSTEM

BACKGROUND

Global positioning systems (GPS) are often used for navigation. GPS receivers receive signals from satellites and determine the position of a GPS receiver based on the signals. At any given time, the GPS receiver may receive signals from a number of different satellites and may determine the position of the GPS receiver based on signals received from satellites that are located the farthest from one another in an attempt to achieve a more accurate position determination. However, the signals received from some satellites may include noise or other interference that creates inaccuracies in the position determination, for example, if the satellite is close to the horizon from the perspective of the GPS receiver. In addition, the position determination may suffer from inaccuracies sometimes inherent in less sophisticated GPS receivers due to, for example, noise or other problems receiving the signals. GPS receivers may also not be able to receive the signals when, for example, a GPS receiver is in a location where the signals are blocked by structures, such as buildings, bridges, or tunnels. As a result, such GPS receivers may not be sufficiently accurate or reliable for some implementations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
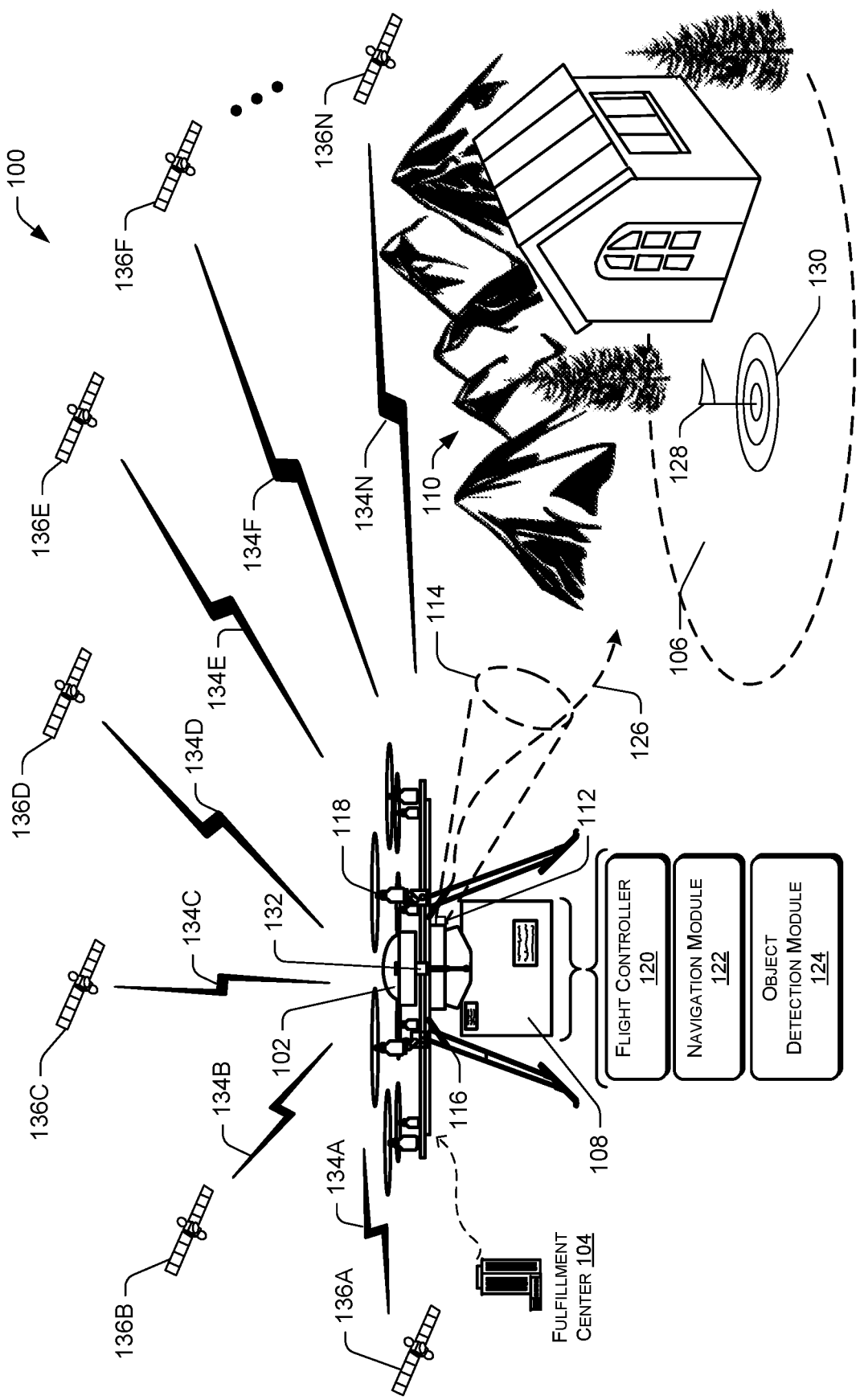
FIG. 1 is a schematic diagram of an illustrative environment that includes an unmanned aerial vehicle (UAV) configured to optimally select GPS satellites for navigation.

This disclosure is generally directed to use of a global positioning system (GPS), which may be deployed on a vehicle, such as a UAV. The GPS may be any type of global navigation satellite system. The GPS may include a GPS receiver configured to estimate a position based on signals received from one or more GPS satellites, for example, four or more satellites. The GPS may include any known type of satellite constellation, which may include, for example, a plurality of medium Earth orbit satellites (e.g., eighteen to thirty-six or more medium Earth orbit satellites) or similar devices. The GPS receiver may also be configured to determine respective distances between the GPS receiver and respective satellites, and determine a position of the GPS receiver based at least in part on the respective distances. For example, when associated with a vehicle, the position may be represented by the north east down (NED) position of the vehicle, where the NED position is represented by three coordinate values corresponding respectively to the vehicle position along the northern axis, the vehicle position along the eastern axis, and the vehicle position along the vertical axis. As used herein, the position may refer to one or more of the three vehicle axis positions.

The system may also include a relative motion module configured to generate signals representative of relative motion of the GPS receiver with respect to a position prior-in-time of the GPS receiver. For example, when associated with a vehicle, the relative motion module may include inertial measurement units configured to generate signals representative of relative motion of the vehicle with respect to a prior-in-time position of the vehicle.

The system may also include a navigation processor configured to receive a first position determination from the GPS receiver based at least in part on first respective distances between the GPS receiver and respective satellites, and determine a relative motion of the GPS receiver with respect to the first position determination based at least in part on signals received from the inertial measurement units. The navigation processor may also be configured to receive second respective distances between the GPS receiver and respective satellites based at least in part on signals received from the respective satellites, and determine second projected distances between the GPS receiver and the respective satellites based at least in part on the relative motion of the GPS receiver with respect to the first position determination. The navigation processor may further be configured to compare the second respective distances with corresponding second projected distances, and select satellites from among the respective satellites for determining a second position of the vehicle based at least in part on the comparison. The GPS receiver may be configured to determine the second position based at least in part on the second respective distances obtained based on signals received from the selected satellites. For example, the navigation processor may be configured to identify satellites from among the respective satellites for which the respective distances are not substantially equal to the corresponding projected distances obtained from the relative motion module, and exclude the identified satellites from the selected satellites. The navigation processor may select satellites from the satellites not excluded, and determine the distances for each of the selected satellites. For example, the navigation processor may be configured to select satellites for which the second respective distances are substantially equal to the corresponding second projected distances. The GPS receiver may use the selected satellites to determine the distances between the GPS receiver and the selected satellites, and these distances may be used to determine the position of the GPS receiver. In examples for which the GPS receiver is associated with a vehicle, the distances may be used to determine the position of the vehicle. In some examples, the vehicle may be an unmanned aerial vehicle (UAV).

Some examples of the system may improve the accuracy and/or the reliability of the position determination of the GPS receiver and/or the position determination of the vehicle as compared to a system that includes a conventional GPS navigation system, but that does not use relative motion of the GPS receiver to select satellites and respective distances between the GPS receiver and the selected satellites for determining position. In some conventional GPS navigation systems, the GPS receiver receives signals from as many as ten to twenty satellites, and may determine the positon of the GPS receiver by determining the respective distances between the GPS receiver and at least three (e.g., four) of the satellites. For example, signals from three or more satellites may be used to triangulate the position of the GPS receiver, and signals from an additional satellite may be used to calculate time. Some such systems may use the distances from satellites that are farthest from one another to determine the position in an attempt to improve the accuracy of the position determination. However, this approach may not result in improving the accuracy of the position determination.

The GPS receiver receives signals from each of the satellites and calculates the distance to each of the respective satellites by determining the amount of time required for a respective signal from each of the satellites to reach the GPS receiver. The GPS receiver thereafter uses at least three of the distances to triangulate the location of the GPS receiver relative to the position of each of the satellites used to determine the position, along with known positions of each of the satellites. However, signal noise or interference may adversely affect or block the signals from the satellites, thereby creating errors in the respective distance determinations and thus the position calculation. In addition, although the GPS receiver may base the position determination on the respective distances to satellites that are farthest from one another, the signals from such satellites may be the subject of noise or interference due, for example, to their close proximity to the horizon relative to the GPS receiver. For example, signals from satellites close to the horizon may be reflected off the surface of the earth and/or may be distorted by the earth's atmosphere, thereby creating inaccuracies in the determinations of the distances between the satellites and the GPS receiver.

Some examples of the system disclosed herein may result in improved accuracy of the determination of the position of the GPS receiver by excluding from satellites used to determine the GPS receiver's position, those satellites for which the distance determination is inaccurate. For example, the system may use a first in time position of the GPS receiver and the relative motion of the GPS receiver relative to the first in time position to determine a second in time position of the GPS receiver. Based on the second in time position, the system may determine projected distances from the second in time position of the GPS receiver to each of the satellites. These projected distances may be compared to corresponding distances between the GPS receiver and each of the satellites determined by the GPS receiver based at least in part of the signals received from the respective satellites. Based on the comparison, the system may identify satellites for which the projected distances determined from the relative motion are different than the distances determined based on the signals from the satellites. The differences in the distances are indicative that the distances determined from the satellite signals are inaccurate. For example, if the differences are greater than an estimated error associated with the projected distances determined based on the relative motion, then the distances based on the signals from the satellites may be inaccurate. By excluding the satellites associated with the inaccurate distances and selecting satellites from among the remaining satellites, the accuracy of the position determination may be improved, for example, in a relatively efficient and/or inexpensive manner.

The techniques and systems described herein may be implemented in a number of ways. Example implementations are provided below with reference to the following figures.

FIG. 1 is a schematic diagram of an illustrative environment 100 that includes a UAV 102 configured to travel through the environment 100. The example environment 100 includes a fulfillment center (FC) 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, and electrical power towers and power wires.

The UAV 102 may be equipped with one or more cameras 112 providing a field of view 114, which may be used for guidance and/or navigation. For example, the camera(s) 112 may enable detection of obstacles to avoid, detect an objective marker, assist with navigation, and/or for other reasons. The UAV 102 may, at times, conduct autonomous flight using information captured by the camera(s) 112.

The UAV 102 may be equipped with a number of components to enable the UAV 102 to perform operations during the delivery of the package 108. For example, the UAV 102 may include a frame 116 and a propulsion system 118 coupled to the frame 116 and configured to propel the UAV 102 through the environment 100. The components may also include a flight controller 120, a navigation module 122, and an object detection module 124, as well as other components discussed below with reference to FIGS. 2-5. For example, the UAV 102 may travel under control of the flight controller 120 and along the flight path 126 toward the destination 106. The flight controller 120 may receive data from the navigation module 122 to assist the flight controller 120 with following the flight path 126 to arrive at the destination 106. The flight controller 120 may continually, or from time to time, provide controls to cause change in a velocity of the UAV 102, a change in heading, a change in altitude, a change in orientation, and/or other changes (e.g., pitch, roll, yaw, hover, etc.), for example, based at least in part on data received from the navigation module 122. In addition, the UAV 102 may execute different controls based on different flight scenarios, such as a takeoff stage, a transport stage, a package deposit stage, and/or a landing stage of flight.

The object detection module 124 may identify objects in imagery captured by the camera(s) 112, which may be used to inform the flight controller 120, and for other reasons, such as to provide communications to the object or to a central command, etc. For example, the object detection module 124 may identify objective markers 128 via analysis of imagery captured by the camera(s) 112. The objective markers 128 may be associated with a waypoint, a drop zone 130 for the destination 106, and/or associated with other locations.

The navigation module 122 of UAV 102 may include a GPS receiver 132 configured to received signals 134 from a number of satellites 136. The GPS receiver 132 may be configured to receive the respective signals 134A, 134B, 134C, 134D, 134E, 134F . . . 134N from the respective satellites 136A, 136B, 136C, 136D, 136E, 136F . . . 136N and determine the position of the GPS receiver 132 (and the UAV 102) based on the respective distances between the GPS receiver 132 and the respective satellites 136, for example, as explained in more detail herein. For example, the GPS receiver 132 may use three or more of the respective distances and the known locations of the respective satellites 136 to determine the position of the GPS receiver 132.

Figure 2:
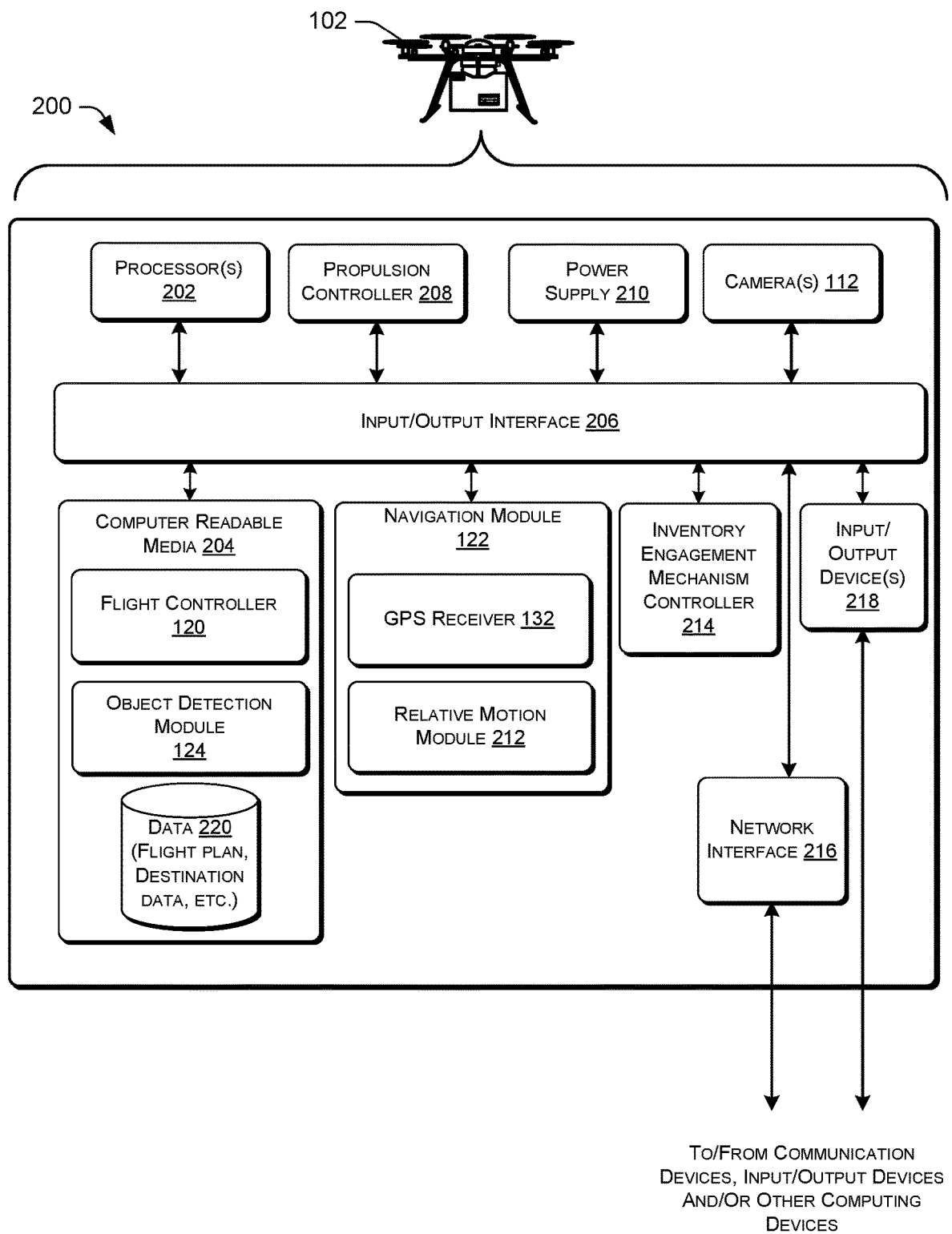
FIG. 2 is a block diagram of an illustrative UAV architecture of the UAV shown in FIG. 1.

FIG. 2 is a block diagram of an illustrative UAV architecture 200 of the UAV 102. The UAV architecture 200 may be used to implement the various systems, devices, and techniques discussed above. In the illustrated implementation, the UAV architecture 200 includes one or more processors 202, coupled to a non-transitory computer readable media 204 via an input/output (I/O) interface 206. The UAV architecture 200 may also include a propulsion controller 208, a power supply module 210, and/or the navigation module 122. The navigation module 122 may include the GPS receiver 132 and a relative motion module 212, as explained in more detail with respect to FIGS. 3 and 4. The UAV architecture 200 further includes an inventory engagement mechanism controller 214 to interact with the package 108, the camera(s) 112, a network interface 216, and one or more input/output (I/O) devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202. In various implementations, the non-transitory computer readable media 204 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 206 may be configured to coordinate I/O traffic between the processor(s) 202, the non-transitory computer readable media 204, and any peripheral devices, the network interface 214 or other peripheral interfaces, such as input/output devices 218. In some implementations, the I/O interface 206 may perform any necessary protocol, timing or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

The propulsion controller 208 may be configured to communicate with the navigation module 122 and/or adjust the power of one or more propulsion devices of the propulsion system 118, such as, for example, propeller motors, to guide the UAV 102 along the determined flight path 126. The propulsion devices may be any known type of propulsion devices. The power supply module 210 may be configured to control the charging and any switching functions associated with one or more power modules (e.g., batteries) of the UAV 102.

As explained herein, the navigation module 122 may include systems to facilitate navigating the UAV 102 to and/or from a location. The inventory engagement mechanism controller 214 may be configured to communicate with actuator(s) and/or motor(s) (e.g., servo motor(s)) used to engage and/or disengage inventory, such as the package 108. For example, when the UAV 102 is positioned over a surface at a delivery location, the inventory engagement mechanism controller 216 may provide an instruction to a motor that controls the inventory engagement mechanism to release the package 108.

As shown in FIG. 2, the network interface 216 may be configured to allow data to be exchanged between the UAV architecture 200, other devices attached to a network, such as other computer systems, and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

The I/O devices 218 may, in some implementations, include sensors such, as accelerometers and/or other I/O devices commonly used in aviation. Multiple I/O devices 218 may be present and controlled by the UAV architecture 200. One or more of the sensors may be utilized to assist in landings as well as avoiding obstacles during flight.

In some embodiments, the computer readable media 204 may store the flight controller 120, the navigation module 122, and the object detection module 124. The components may access and/or write data 220, which may include flight plan data, log data, destination data, image data, and object data, and so forth. The operations of the flight controller 120, the navigation module 122, and the object detection module 124 are described above, and also below by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Figure 5:
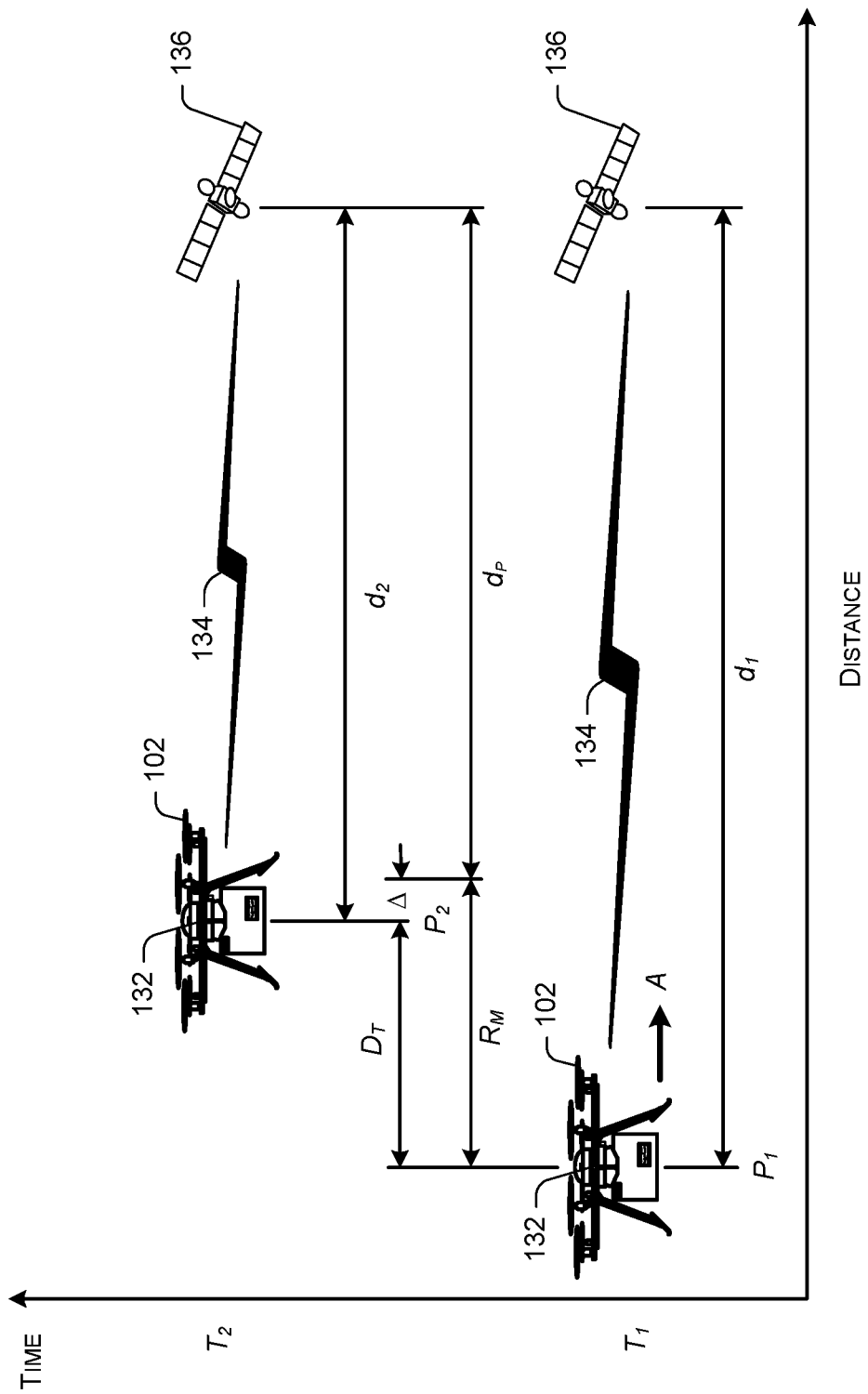
FIG. 5 is a graph showing illustrative distances between a UAV and a satellite.

Although FIGS. 1, 2, and 5 depict a UAV 102, other vehicles may deploy the navigation module 122 described herein, such as land vehicles (cars, trucks, etc.), marine vehicles (boats, ships, etc.), and/or other types of aircraft. In some examples, the navigation module 122 may be deployed without a vehicle, for example, in a computing device. For example, the navigation module 122 may be deployed in hand-held computing devices and/or wearable computing devices.

Figure 3:
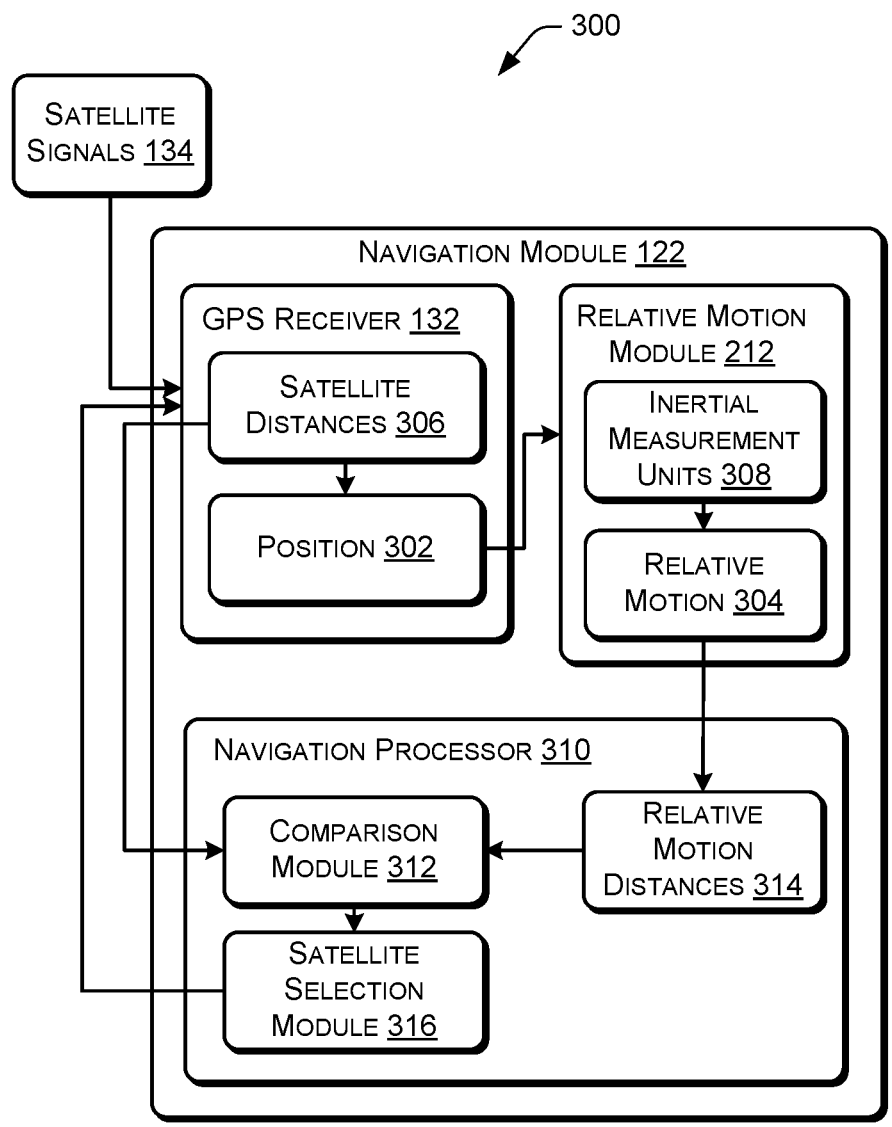
FIG. 3 is a block diagram of an illustrative UAV architecture including an illustrative navigation module including a GPS receiver and a relative motion module.

FIG. 3 is a block diagram of an example embodiment of the navigation module 122. In some examples, the navigation module 122 may include a GPS receiver 132 configured to determine the position 302 of the UAV 102, and a relative motion module 212 configured to determine the relative motion 304 of the UAV 102 relative a prior-in-time position of the UAV 102. For example, the GPS receiver 132 may be configured to receive satellite signals 134 from the satellites 136 (see FIG. 1), determine the respective satellite distances 306 between the GPS receiver 132 and the respective satellites 136, and based on those distances 306, determine the position 302 of the GPS receiver 132 (and the UAV 102 to which the GPS receiver 132 is coupled), as explained in more detail with respect to FIG. 4.

The relative motion module 212 may be configured to determine the relative motion 304 of the GPS receiver 132 and UAV 102 from a given position corresponding to a first time. For example, the relative motion module 212 may be configured to determine at a second time the relative motion 304 of the UAV 102 relative to the given position during a time period following the first time at which the UAV 102 was located at the given position. In some examples, the relative motion module 212 may include inertial measurement units 308 configured to generate signals representative of the relative motion 304 of the GPS receiver 132 (and the UAV 102 to which the GPS receiver 132 is coupled). For example, the inertial measurement units 308 may include measurement devices configured to generate signals representative angular accelerations and/or linear accelerations of the GPS receiver 132, such as, for example, angular accelerometers such as gyroscopes, and linear accelerometers. In some examples, the inertial measurement units 304 may include at least three gyroscopes and at least three linear accelerometers.

For example, the navigation processor 310 may determine the updated position by starting from a first position 302 received from the GPS receiver 132, and adding to the first position one or more of the distance, direction, and altitude change based on the relative motion 304 determination. In other words, the navigation processor 310, from a known starting point, adds one or more of the distance of movement, the direction of movement, and the altitude change determinations to determine the position to which the GPS receiver 132 and UAV 102 have travelled.

The navigation module 122 may use the GPS receiver 132 and the relative motion module 212 to determine the position 302 of the GPS receiver 132 and the UAV 102 at a second time. For example, the relative motion module 212 may receive a first position 302 corresponding to a first time from the GPS receiver 132 and determine the relative motion 304 of the GPS receiver 132 and the UAV 102 during the time from the first time at which the GPS receiver 132 and the UAV 102 are located at the first position 302, to a second time following the first time. In some examples, the inertial measurement units 308 may include angular and linear accelerometers that determine the angular and linear accelerations of the GPS receiver 132 and the UAV 102 during the time spanning from the first time to the second time. The relative motion module 212 may be configured to integrate the angular and linear accelerations to obtain the velocity and/or position during the time period from the first time to the second time, and thereby determine the relative motion 304 of the GPS receiver 132 and the UAV 102.

As shown in FIG. 3, the navigation module 122 may include a navigation processor 310 configured to receive the relative motion 304 from the relative motion module 212 and select satellites 136 from among a plurality of satellites 136 for use in determining the positon 302 of the GPS receiver 132 and the UAV 102. For example, the navigation processor 310 may include a comparison module 312 configured to compare (1) satellite distances 306 determined based on satellite signals 134 received from the respective satellites 136, and (2) relative motion distances 314 determined based on the relative motion 304 determined by the relative motion module 212. The navigation processor 310 may also include a satellite selection module 316 configured to receive the results of the distance comparisons and select satellites 136 from among the satellites 136 for determining a second position of the GPS receiver 132 and the UAV 102.

For example, the navigation processor 310 may receive the relative motion 304 determined by the relative motion module 212. Based on the relative motion 304, the navigation processor 310 may project the second position of the GPS receiver 132 and the UAV 102 relative to the first position. Based on the projected second position at the second time, the navigation module 310 may determine projected distances between the GPS receiver 132 at the second position and each of the satellites 136. These projected distances at the second time based on the relative motion may be compared with satellite distances 306 determined for the second position of the GPS receiver 132 at the second time. For example, at the second time, the GPS receiver 132 receives the satellite signals 134 for each of the satellites 136 within range and determines the respective satellite distances 306 based on the satellite signals 134. The comparison module 312 compares the respective relative motion distances 314 for each of the satellites 136 with the corresponding respective satellite distances 306 for each of the satellites 136. If the corresponding distances are not substantially equal, it is an indication that the satellite distances 306 are inaccurate and should not be used to determine the position of the GPS receiver 132 and the UAV 102 at the second time. In some examples, corresponding distances are not substantially equal if the difference between the corresponding distances is greater than an estimated inaccuracy of the relative motion distances 314 determined based on the relative motion 304 of the GPS receiver 132.

In some examples, for each of the satellites 136 for which the respective satellite distances 306 are not substantially equal to the corresponding respective relative motion distances 314, the satellite selection module 316 may be configured to identify those satellites 136 to be excluded for use in determining the position of the GPS receiver 132 and the UAV 102. This information may be communicated to the GPS receiver 132, and the GPS receiver 132 may use satellites other than the identified satellites 136 for determining the position of the GPS receiver 132 and the UAV 102 at the second time. The GPS receiver 132 will limit its selection of satellite distances 306 to those satellites 136 for which the satellite distances 306 are substantially equal to the corresponding relative motion distances 314. The GPS receiver 132, in turn, will use those selected satellite distances 306 to determine the position 302 of the GPS receiver 132 and the UAV 102 at the second time. In this example manner, by excluding the satellites 136 for which the satellite distances 306 are inaccurate, the accuracy and/or reliability of the positon of the GPS receiver 132 and the UAV 102 determined by the GPS receiver 132 may be improved.

Figure 4:
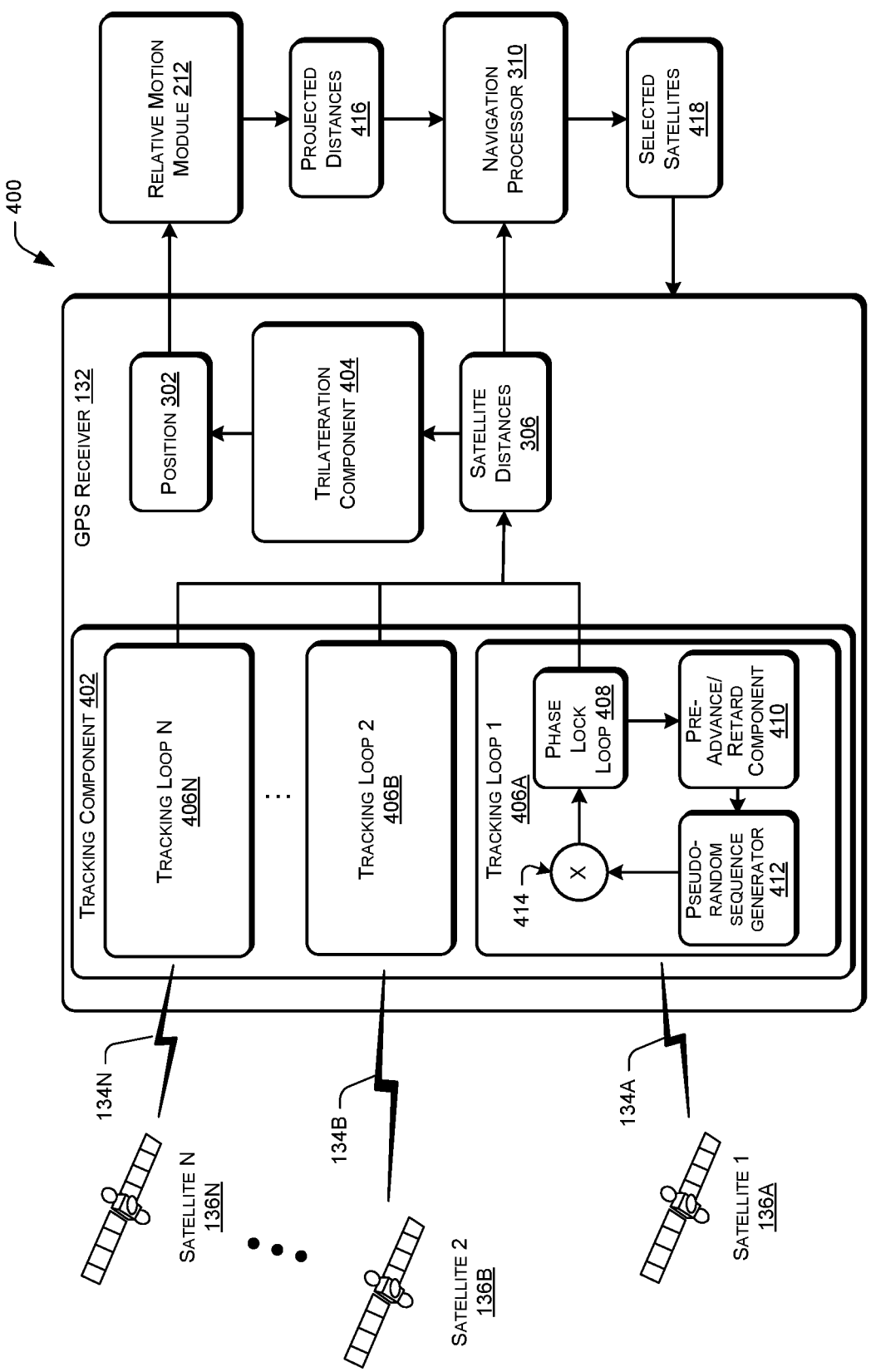
FIG. 4 is a schematic diagram including an illustrative GPS receiver receiving signals from satellites and an illustrative relative motion module and illustrative navigation processor.

FIG. 4 is a schematic diagram of an illustrative computing architecture 400 including an illustrative GPS receiver 132 receiving signals from satellites 136. In the example shown, the GPS receiver 132 includes a tracking component 402 and a trilateration component 404 in communication with the tracking component 402. The example tracking component 402 includes at least three tracking loops: tracking loop 1 (406A), tracking loop 2 (406B), through tracking loop N (406N), each in communication with the trilateration component 404. The GPS receiver 132 may include more tracking loops.

As explained in more detail herein, the tracking loops 406 are configured to receive respective signals 134 from respective satellites 136 and determine the respective satellite distances 306 from the satellites 136 to the GPS receiver 132. The determined distances are provided to the trilateration component 404, which is configured to determine the position of the GPS receiver 132, which, if coupled to the UAV 102, corresponds to the position of the UAV 102.

As shown in FIG. 4, the example GPS receiver 132 is configured to receive signals from the satellites 136. In the example shown, the satellites 136 include satellite 1 (136A), satellite 2 (136B), through satellite N (136N). More than three satellites 136 are contemplated. In some examples, a dozen or more satellites 136 may be in range of the GPS receiver 132. In the example shown, tracking loop 1 (406A) receives signals 134A from satellite 1 (136A), tracking loop 2 (406B) receives signals 134B from satellite 2 (136B), and the other tracking loops through tracking loop N (406N) receive signals 134N from the other satellites 136 through satellite N (136N). The respective tracking loops 406 are configured to determine the respective satellite distances 306 between the respective satellites 136 and the GPS receiver 132 by determining the time it takes to receive respective signals 134 from the respective satellites 136. Because the signals 134 travel at a known speed (i.e., the speed of light), determining the amount of time it takes for the signals 134 to reach the GPS receiver 132 enables calculation of the respective satellite distances 134 between each of the satellites 136 and the GPS receiver 132. This distance 306 represents the surface of a sphere, a point on which the GPS receiver 132 is located. The location of each of the satellites 136 is known and may be transmitted by the satellites 136 to the GPS receiver 132. By determining the satellite distances 306 between each of the three or more satellites 136 and the GPS receiver 132, the position of the GPS receiver 132 (and the UAV 102) may be determined by trilateration via the trilateration component 404, which determines the point at which the surfaces of the three spheres intersect. In some examples, more than three spheres may be used to determine position.

In the example shown in FIG. 4, the tracking loop 1 (406A) includes a phase lock loop 408, a pre-advance/retard component 410, a pseudo-random sequence generator 412, and a correlator 414. One or more of the other tracking loops 2 through N may also include one or more of these example components, and in systems that include more than three tracking loops, one or more of those tracking loops may include one or more of these example components.

In some examples, the time for the signals 134 to reach the GPS receiver 132 from the satellites 136 may be determined by generating a pseudo-random sequence by the pseudo-random sequence generator 412, and determining the time delay in receiving the same or similar pseudo-random sequence from the respective satellite 136. For example, satellite 1 (136A) and tracking loop 1 (406A) may each simultaneously generate the same or similar pseudo-random sequence. Satellite 1 (136A) includes the pseudo-random sequence in the signals it sends, and tracking loop 1 (406A) receives the signals 134A and determines via, for example, the correlator 414 and the phase lock loop 408, the time corresponding to the delay receiving the pseudo-random sequence from satellite 1 (406A). This time delay corresponds to the time required for the signals 134A to travel from satellite 1 (136A) to the GPS receiver 132. Because the speed of travel of the signals 134A is known, the distance between the satellite 1 (136A) and the GPS receiver 132 may be determined. This process may be performed by each of the satellite 136 and tracking loop 406 pairs, and the position of the GPS receiver 132, and thus, the UAV 102 associated with the GPS receiver 132, may be determined via the trilateration component 404.

As noted above, the signals 134 from some satellites 136 may be corrupted by noise or other factors that result in the satellite distances 306 associated with some satellites 136 being inaccurate. For example, in some conventional GPS navigation systems, the GPS receiver receives signals from as many as ten to twenty satellites, and may determine the positon of the GPS receiver by determining the respective distances between the GPS receiver and at least three of the satellites. In an attempt to improve the accuracy of the position determination, some such systems may use the distances from satellites that are farthest from one another to determine the position. However, satellite signals received from satellites that are the farthest from one another may be subject to noise or other sources of corruption. For example, satellites that are farthest from one another may be subject to noise or interference due, for example, to their relatively close proximity to the horizon relative to the GPS receiver. For example, such satellites may be located at opposite or spaced horizons. The signals from such satellites may be reflected off the surface of the earth and/or may be distorted by the earth's atmosphere, thereby creating inaccuracies in the determinations of the distances between those satellites and the GPS receiver. As a result, if the GPS receiver uses those signals to determine the position of the GPS receiver, the position determination will also likely be inaccurate, or at least not as accurate as desired in some applications.

Some examples of the system and methods disclosed herein may mitigate or eliminate this possibility by identifying satellites for which the distance determinations are inaccurate, and using the distances to other satellites to determine the position of the GPS receiver. For example, as explained with respect to FIG. 3 and shown in FIG. 4, the relative motion module 212 receives the position 302 of the GPS receiver 132 at a first point in time. The relative motion module 212 then determines the relative motion of the GPS receiver 132 between the first point in time and a later, second point in time. For example, the relative motion module 212 may include inertial measurement units 308, such as angular and linear accelerometers, to determine the relative motion 304 of the GPS receiver 132 during the period of time between the first point in time and the second point in time to determine a second position of the GPS receiver 132 at the second point in time. The navigation processor 310 may use the second position determined by the relative motion module 212 to determine respective projected distances 416 (e.g., the relative motion distances 314 shown in FIG. 3) between the GPS receiver 132 and the respective satellites 136. The navigation processor 310 may also receive the satellite distances 306 determined at the second point in time based on the satellite signals 134. The navigation processor 310 may compare the respective projected distances 416 to the corresponding satellites distances 306, for example, via the comparison module 312. The navigation processor 310 may thereafter identify satellite distances 306 that are not substantially the equal to the corresponding respective projected distances 416 determined based on the relative motion 304 of the GPS receiver 132. In some examples, distances may be considered substantially equal to one another if the difference between the distances is less than or equal to the estimated error associated with the projected distances 416 determined by the relative motion module 212. In relative motion modules that use inertial measurement units to determine relative motion, the error may correlate to the drift associated with the relative motion determined by the inertial measurement units.

The navigation processor 310 may select satellites 136 (e.g., selected satellites 418) from among the respective satellites 136 (e.g., the satellites 136 within range of the GPS receiver 132) for determining the position of the GPS receiver 132 and the UAV 102, for example, via the satellite selection module 316 (FIG. 3). In some examples, this may include excluding satellites 136 for use in determining the position of the GPS receiver 132 for which the respective satellite distances 306 are not substantially the equal to the corresponding respective projected distances 416 determined based on the relative motion 304 of the GPS receiver 132. Based on the selected satellites 418, the GPS receiver 132 may determine the second position of the GPS receiver 132 at the second point in time using the satellite distances 306 determined based on the satellite signals 134 received from the selected satellites 418. In some examples, by excluding the satellites 136 for which the respective satellite distances are inaccurate, the position of the GPS receiver 132 and the UAV 102 may be determined more accurately and/or reliably using the GPS receiver 132 and the satellite signals 134 associated with the selected satellites 418.

FIG. 5 is a graph showing illustrative distances $d_1$ and $d_2$ between a UAV 102 and a satellite 136 as the UAV 102 travels from a first position $P_1$ at a first point in time $T_1$ to a second position $P_2$ at a second point in time $T_2$. As shown, the UAV 102 carrying the GPS receiver 132 travels in the direction A from $P_1$ at time $T_1$ to position $P_2$ at time $T_2$ over a total distance DT equal to the difference $d_1$–$d_2$. Although the example shown is limited to movement in two dimensions, it is contemplated that movement may be in three dimensions. As the UAV 102 travels toward the satellite 136 in the example shown, the distance $d_2$ to the satellite 136 is reduced from $d_1$ to $d_2$. In some examples, the GPS receiver 132 receives the satellite signals 134 from the satellite 136 and determines the distance & from the GPS receiver 132 to the satellite 136, as explained herein. In addition, the relative motion module 212 may determine the relative motion 304 (depicted as $R_M$ in FIG. 5), and the navigation processor 310 may determine the projected distance $d_p$ between the GPS receiver 132 and the satellite 136 based on the relative motion $R_M$. The navigation processor 310 may compare the distance $d_2$ determined based on the satellite signals 134 to the projected distance $d_p$ determined based on the relative motion $R_M$ to determine a difference $\Delta$ between the two distances. In some examples, if the difference $\Delta$ between the two distances $d_2$ and $d_p$ is more than, for example, a predetermined distance, the navigation processor 310 may exclude the satellite 136 from satellites used to determine the position of the GPS receiver 132 and the UAV 102. For example, if the difference $\Delta$ is greater than an estimated error associated with the relative motion $R_M$ determination, then the satellite 136 may be excluded from use for determining the position of the GPS receiver 132 and the UAV 102. If on the other hand, the difference $\Delta$ is less than or equal to the estimated error associated with the relative motion $R_M$ determination, then the satellite 136 may be selected for use in determining the position of the GPS receiver 132 and the UAV 102. Criteria other than, or in addition to, the estimated error may be used to determine whether the difference $\Delta$ should result in the satellite 136 being selected or excluded from use in determining the position of the GPS receiver 132 and the UAV 102. In some examples, once three or more of the satellites 136 in range of the GPS receiver 132 are selected, the GPS receiver 132 may use the selected satellites 136 and the respective satellite signals 134 to determine the position of the GPS receiver 132 and UAV 102, for example, as explained herein.

Figure 6:
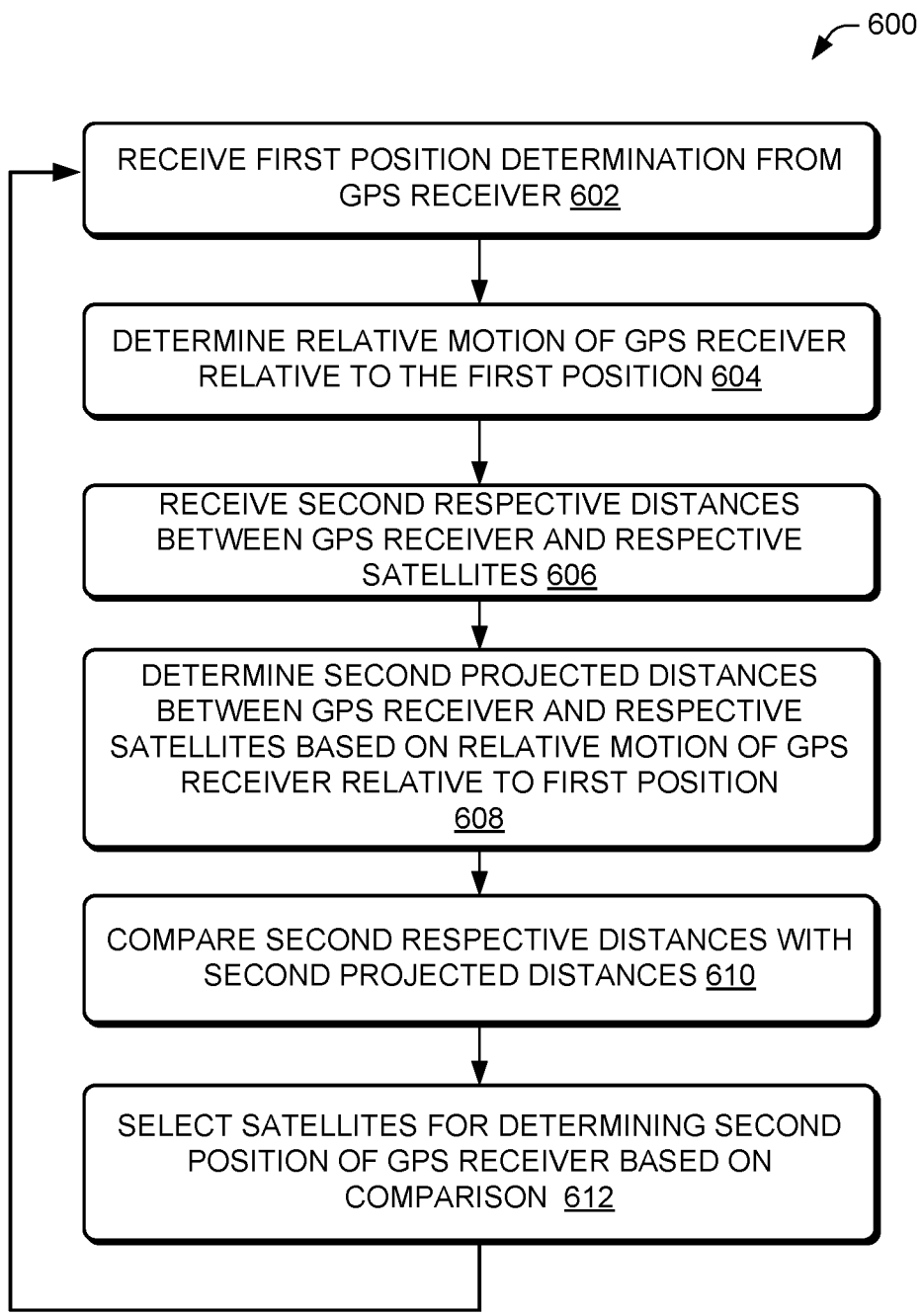
FIG. 6 is a flow diagram of an illustrative process for selecting satellites for use by a GPS receiver.
Figure 7:
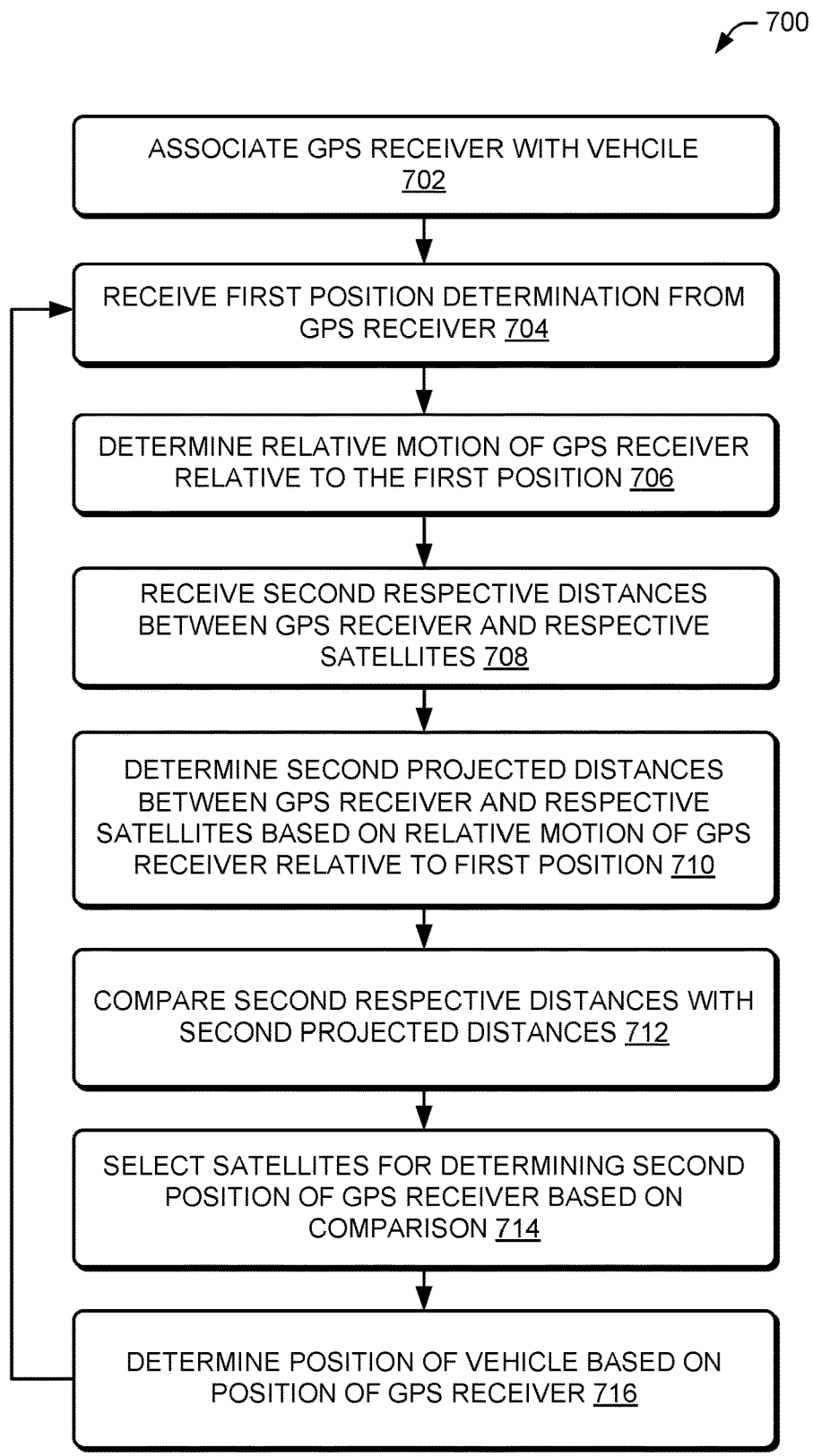
FIG. 7 is a flow diagram of an illustrative process for determining the position of a vehicle.

FIGS. 6 and 7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an illustrative process 600 for selecting satellites for use in determining the position of a GPS receiver. The process 600 may be implemented in the environment 100 and by the UAV architecture 200 described above, or in other environments and architectures.

In the illustrative process 600, at 602, the process 600 may include receiving a first position determination from, for example, the GPS receiver based at least in part on first respective distances between the GPS receiver and respective satellites. In some examples, the GPS receiver may be configured receive signals from satellites, determine respective distances between the GPS receiver and respective satellites, and determine a position of the GPS receiver based at least in part on the respective distances.

At 604, the process 600 may include determining a relative motion of the GPS receiver with respect to the first position determination based at least in part on signals received from a relative motion module. For example, the first position received at 602 may be received by the relative motion module, and the relative motion module may determine the motion the GPS receiver relative to the first position. In some examples, the relative motion module may include inertial measurement units configured to generate signals representative of the relative motion of the GPS receiver with respect to the first position. For example, the inertial measurement units may include one or more angular and linear accelerometers configured to generate signals representative of the angular and linear accelerations of the GPS receiver relative to the first position. The relative motion module may be further configured to integrate the accelerations to determine velocities, and integrate the velocities to determine the relative position of the GPS receiver.

At 606, the process 600 may include receiving second respective distances between the GPS receiver and respective satellites determined based at least in part on signals received from the respective satellites. As the GPS receiver moves from the first position, the respective distances between the GPS receiver and the respective satellites change. As the respective distances change, the time for the respective satellite signals to reach the GPS receiver from the respective satellites changes, and the GPS receiver is configured to determine the respective distances based on the signals received from the respective satellites.

The example process 600, at 608, may include determining second projected distances between the GPS receiver and the respective satellites based at least in part on the relative motion of the GPS receiver with respect to the first position determination. For example, a navigation processor may receive the relative motion determination from the relative motion module and determine the respective projected distances to the satellites at the second position based at least in part on the relative motion determination, for example, as discussed herein.

At 610, the process 600 may include comparing the second respective distances obtained via the satellite signals with corresponding second projected distances obtained via the relative motion determination. For example, the navigation processor may include a comparison module configured to receive the second respective distances and the corresponding respective second projected distances, and compare the second respective distances and the corresponding respective second projected distances to one another. For example, for each of the satellites, the second respective distances and the corresponding second projected distances may be compared to one another to determine respective differences between the two sets of distance values.

At 612, the process 600 may include selecting satellites from among the respective satellites for determining a second position of the GPS receiver based at least in part on the comparison at 610. In some examples, the navigation processor may include a satellite selection module configured to receive the differences determined at 610 and select satellites for use in determining the second position of the GPS receiver based at least in part on the differences. For example, the satellite selection module may select satellites for which the respective second distances are substantially equal to the corresponding second respective projected distances. In some examples, if the differences are greater than a certain amount, the satellite selection module may exclude satellites for use in determining the second position for which the respective differences are greater than the certain amount. The amount may be predetermined or based on real-time related criteria, such as, for example, an estimated error associated with the projected distance determinations, for example, as explained herein.

FIG. 7 is a flow diagram of an illustrative process 700 for determining the position of a vehicle (e.g., UAV 102). The process 700 may be implemented in the environment 100 and by the UAV architecture 200 described above, or in other environments and architectures.

In the illustrative process 700, at 702, a GPS receiver may be associated with a vehicle. For example, the GPS receiver may be coupled directly or indirectly to the vehicle, for example, so that the position of the vehicle may be determined by determining the position of the GPS receiver.

At 704, the process 700 may include receiving a first position of the vehicle from, for example, the GPS receiver based at least in part on first respective distances between the GPS receiver and respective satellites. In some examples, the GPS receiver may be configured receive signals from satellites, determine respective distances between the GPS receiver and the respective satellites, and determine a position of the GPS receiver based at least in part on the respective distances.

At 706, the process 700 may include determining a relative motion of the GPS receiver with respect to the first position determination based at least in part on signals received from a relative motion module. For example, the first position received at 704 may be received by the relative motion module, and the relative motion module may determine the motion the GPS receiver relative to the first position. In some examples, the relative motion module may include inertial measurement units configured to generate signals representative of the relative motion of the GPS receiver with respect to the first position. For example, the inertial measurement units may include one or more angular and linear accelerometers configured to generate signals representative of the angular and linear accelerations of the GPS receiver relative to the first position. The relative motion module may be further configured to integrate the accelerations to determine velocities, and integrate the velocities to determine the relative position of the GPS receiver.

At 708, the process 700 may include receiving second respective distances between the GPS receiver and respective satellites determined based at least in part on signals received from the respective satellites. As the vehicle moves, the GPS receiver moves from the first position, and the respective distances between the GPS receiver and the respective satellites change. As the respective distances change, the time for the respective satellite signals to reach the GPS receiver from the respective satellites changes, and the GPS receiver is configured to determine the respective distances based on the signals received from the respective satellites.

The example process 700, at 710, may include determining second projected distances between the GPS receiver and the respective satellites based at least in part on the relative motion of the GPS receiver with respect to the first position determination. For example, a navigation processor may receive the relative motion determination from the relative motion module and determine the respective projected distances to the satellites at the second position based at least in part on the relative motion determination, for example, as discussed herein.

At 712, the process 700 may include comparing the second respective distances obtained via the satellite signals with corresponding second projected distances obtained via the relative motion determination. For example, the navigation processor may include a comparison module configured to receive the second respective distances and the corresponding respective second projected distances, and compare the second respective distances and the corresponding respective second projected distances to one another. For example, for each of the satellites, the second respective distances and the corresponding second projected distances may be compared to one another to determine respective differences between the two sets of distance values.

At 714, the process 700 may include selecting satellites from among the respective satellites for determining a second position of the GPS receiver based at least in part on the comparison at 712. In some examples, the navigation processor may include a satellite selection module configured to receive the differences determined at 712 and select satellites for use in determining the second position of the GPS receiver based at least in part on the differences. For example, the satellite selection module may select satellites for which the respective second distances are substantially equal to the corresponding second respective projected distances. In some examples, if the differences are greater than a certain amount, the satellite selection module may exclude satellites for use in determining the second position for which the respective differences are greater than the certain amount. The amount may be predetermined or based on real-time related criteria, such as, for example, an estimated error associated with the projected distance determinations, for example, as explained herein.

At 716, the process 700 may include determining the position of the vehicle based at least in part on the position of the GPS receiver.

In some examples of the process 700, the steps relating to the position determination may be synchronized with the steps relating to the relative motion determination. In some examples of the process 700, the steps relating to the position determination may not be synchronized with the steps relating to the relative motion determination.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining a first position of a global positioning system (GPS) receiver;
   determining, at a second position of the GPS receiver, a relative motion of the GPS receiver with respect to the first position;
   determining, at the second position, respective distances between the GPS receiver and respective satellites based at least in part on respective signals received from the respective satellites by the GPS receiver, the respective satellites including at least three satellites;
   determining projected distances between the GPS receiver and the respective satellites at the second position based at least in part on the relative motion of the GPS receiver with respect to the first position, the projected distances different from the respective distances;
   comparing the respective distances with corresponding projected distances to determine differences between the respective distances and the corresponding projected distances;
   determining that one or more of the differences is equal to or greater than an estimated error associated with the corresponding projected distances, the estimated error correlated to a drift associated with the relative motion of the GPS receiver determined by one or more inertial measurement units; and
   identifying one or more excluded satellites from among the respective satellites based at least in part on comparing the respective distances with the corresponding projected distances, the one or more excluded satellites to be excluded for use in determining the second position of the GPS receiver.

2. The method as recited in claim 1, wherein determining the projected distances between the GPS receiver and the respective satellites comprises determining the second position based at least in part on the relative motion of the GPS receiver with respect to the first position, and determining the projected distances based at least in part on the second position.

3. The method as recited in claim 1, further comprising selecting one or more satellites from the respective satellites for which the respective distances are substantially equal to the corresponding projected distances.

4. The method as recited in claim 1, wherein determining, at the second position, the relative motion of the GPS receiver comprises determining the relative motion based at least in part on signals received from the one or more inertial measurement units.

5. The method as recited in claim 1, wherein determining, at the second position, the relative motion of the GPS receiver comprises determining the relative motion based at least in part on signals received from angular accelerometers and linear accelerometers.

6. The method as recited in claim 1, wherein the GPS receiver is associated with a vehicle, and the method further comprises determining a third position of the vehicle based at least in part on respective distances between the GPS receiver and the respective satellites.

7. The method as recited in claim 6, wherein determining a position of the vehicle comprises receiving by the GPS receiver respective signals from the respective satellites, and determining the respective distances between the GPS receiver and the respective satellites is based at least in part on the respective signals received from the respective satellites.

8. The method as recited in claim 6, further comprising causing a change in at least one of a velocity, a heading, an altitude, or an orientation of the vehicle based at least in part on the third position.

9. The method as recited in claim 8, wherein the change in the at least one of the velocity, the heading, the altitude, or the orientation of the vehicle is based at least in part on a current flight scenario associated with the vehicle.

10. The method as recited in claim 6, further comprising:
identifying as selected satellites from the respective satellites for determining the second position of the vehicle, the selected satellites excluding the excluded satellites; and
determining the second position of the GPS receiver based at least in part on data received from the selected satellites.

11. The method as recited in claim 1, wherein the relative motion of the vehicle includes a distance of movement, a direction of movement, and an altitude change.

12. A method comprising:
receiving a first position determination from a global positioning system (GPS) receiver based at least in part on first respective distances between the GPS receiver and a first set of a plurality of satellites;
determining a relative motion of a vehicle with respect to the first position determination based at least in part on first signals received from one or more inertial measurement units;
receiving second respective distances between the GPS receiver and at least some of the plurality of satellites based at least in part on second signals received from the first set of the plurality of satellites;
determining second projected distances between the GPS receiver and the at least some of the plurality of satellites based at least in part on the relative motion of the vehicle with respect to the first position determination;
comparing the second respective distances with corresponding second projected distances to determine differences between the second respective distances and the corresponding second projected distances, the differences including a first difference associated with a first satellite of the first set of the plurality of satellites;
determining that the first difference associated with the first satellite is equal to or greater than an estimated error associated with the corresponding second projected distances, the estimated error correlated to a drift associated with the relative motion of the vehicle determined by the one or more inertial measurement units;
excluding at least the first satellite of the first set of the plurality of satellites from a second set of the plurality of satellites based at least in part on determining that the first difference is equal to or greater than the estimated error; and
determining the second position of the vehicle based at least in part on third signals received from the second set of the plurality of satellites.

13. The method as recited in claim 12, wherein the vehicle is an unmanned aerial vehicle (UAV), the method further comprising:
determining, via the GPS receiver, the second position based at least in part on the third signals received from the second set of the plurality of satellites.

14. The method as recited in claim 12, further comprising selecting satellites from the second set of the plurality of satellites for which the second respective distances are substantially equal to the corresponding second projected distances.

15. The method as recited in claim 12, wherein determining the relative motion of the vehicle with respect to the first position determination comprises determining the relative motion via a signal from at least one of gyroscopes or linear accelerometers.

16. The method as recited in claim 12, wherein:
the relative motion of the vehicle includes a distance of movement, a direction of movement, and an altitude change; and
determining the second projected position is based at least in part on the distance of movement, the direction of movement, and the altitude change.

17. A method comprising:
receiving a first position of a vehicle from a global positioning system (GPS) receiver;
determining, at a second position of the vehicle, a distance of movement, a direction of movement, and an altitude change of the vehicle with respect to the first position of the vehicle from the GPS receiver based at least in part on signals received from one or more inertial measurement units;
receiving respective distances between the GPS receiver at the second position and respective satellites;
determining projected distances between the GPS receiver and the respective satellites based at least in part on the distance of movement, the direction of movement, and the altitude change of the vehicle with respect to the first position of the vehicle from the GPS receiver;
comparing the respective distances with corresponding projected distances to determine differences between the respective distances and the corresponding projected distances;
determining that one or more of the differences is equal to or greater than an estimated error associated with the corresponding projected distances, the estimated error correlated to a drift associated with the distance of movement, the direction of movement, or the altitude change of the vehicle determined by the one or more inertial measurement units;
identifying excluded satellites from among the respective satellites based at least in part on comparing the respective distances with the corresponding projected distances, the excluded satellites to be excluded for use in determining the second position of the GPS receiver; and
selecting as selected satellites from among the respective satellites for determining the second position of the vehicle, the selected satellites excluding the excluded satellites.

18. The method as recited in claim 17, further comprising:

determining, via the GPS receiver, the respective distances between the GPS receiver and the selected satellites; and determining the second position of the vehicle based at least in part on the respective distances between the GPS receiver and the selected satellites.

19. The method as recited in claim 17, wherein selecting the selected satellites comprises:

identifying as identified satellites from among the respective satellites for which the respective distances are not substantially equal to the corresponding projected distances; and excluding the identified satellites from the selected satellites.

20. The method as recited in claim 17, wherein determining the distance of movement, the direction of movement, and the altitude change of the vehicle comprises receiving a signal from at least one of angular accelerometer or linear accelerometer.

* * * * *